United States Patent [19]
Goldhar et al.

[11] 3,979,694
[45] Sept. 7, 1976

[54] SHORT LASER PULSE GENERATION BY GAS BREAKDOWN SWITCHING AND HIGHLY SELECTIVE SPECTRAL FILTERING

[75] Inventors: Julius Goldhar, Boston, Mass.; Eli Yablonovitch, Shrewsbury, N.J.

[73] Assignee: Bell Telephone Laboratories, Incorporated, Murray Hill, N.J.

[22] Filed: July 3, 1974

[21] Appl. No.: 485,361

[52] U.S. Cl. ............................................. 331/94.5 M
[51] Int. Cl.² ......................................... H01S 3/101
[58] Field of Search .................... 331/94.5; 330/4.3

[56] References Cited
OTHER PUBLICATIONS

Yablonovitch, Similarity Principles for Laser–Induced Breakdown in Gases, Appl. Phys. Lett., vol. 23, No. 3 (Aug. 1, 1973) pp. 121–122.
Milam et al., Production of Intense Subnanosecond Pulses by Cavity Dumping, IEEE J. Quant. Elect., QE–10, No. 1 (Jan. 1974) pp. 20–25.

*Primary Examiner*—William L. Sikes
*Attorney, Agent, or Firm*—W. L. Wisner

[57] ABSTRACT

In a laser pulse generator, short pulses adjustable in the range between about 0.1 and 0.5 nanoseconds are produced by improved spectral filtering of the output of a gas breakdown switch. The spectral filter in one embodiment is a hot, linearly absorbing gas cell that passes both sidebands of the radiation producing the gas breakdown in the switch and that linearly absorbs the center frequency. A second embodiment uses a tandem dual-slit monochromator as the spectral filter in order to pass both sidebands. The hot gas cell is simpler, cheaper and characterized by a higher rejection ratio than any other alternative to date. It yields very clean pulses with a steeper leading edge than prior techniques. The leading edge is highly reproducible, as needed for nuclear fusion work. The advantage over prior pulsed $CO_2$ lasers for nuclear fusion work is substantial, since those prior lasers have not achieved pulse durations less than one nanosecond.

4 Claims, 5 Drawing Figures

SHORT LASER PULSE GENERATION BY GAS BREAKDOWN SWITCHING AND HIGHLY SELECTIVE SPECTRAL FILTERING

BACKGROUND OF THE INVENTION

This invention relates to short laser pulse generators of the type which pass the sidebands generated by a laser breakdown spark.

In the short history of the development of the laser art and its applications, which are only now beginning to unfold, laser-induced breakdown of gases has been an easily observed and dramatic effect. Recent experiments have shown that laser-induced breakdown of gases can be accompanied by substantial spectral broadening and self-phase modulation. Of more relevance for practical utilization is the observation that the breakdown plasma cuts off transmission of most of the incident beam in a time as short as 30 picoseconds.

The basic concept of short pulse generation from a laser spark is to employ a spectral filter that blocks the incident laser center wavelength but transmits a sideband produced by the sudden plasma growth. Among the types of spectral filters that have been suggested are the Michelson interferometer, the Fabry-Perot etalon and the grating monochromator. Of these only the grating monochromator can have sufficient rejection ratio to be of practical interest. Nevertheless, it is an expensive and inconvenient instrument to use and conventionally passes only one sideband yielded by the plasma.

It is desirable to obtain a more effective spectral filter, preferably a simpler one, for use in generation of short pulses by laser-induced breakdown in gases.

SUMMARY OF THE INVENTION

Our invention provides short pulse generation by a laser-induced breakdown in a gas cell, hereinafter called a gas breakdown switch, by highly selective spectral filtering that passes both sidebands and substantially completely rejects the laser center wavelength that actuates the gas breakdown switch.

According to one species of our invention, the spectral filter is a hot, linearly absorbing gas cell that passes both sidebands and linearly absorbs the center wavelengths. This embodiment yields the simplest and cheapest apparatus with the highest rejection ratio. This apparatus produces such clean, reproducible pulses with such steep leading edges that it is a strong candidate for use in nuclear fusion work. It is competitive with the prior pulse lasers, which have not achieved pulse durations less than about one nanosecond in such applications.

According to a second species of our invention the spectral filter is a tandem grating monochromator of a type which may be called a tandem dual-slit monochromator. The dual-slit components of this apparatus are aligned and adapted for passing both sidebands yielded by the gas breakdown switch and for blocking the center wavelength.

BRIEF DESCRIPTION OF THE DRAWINGS

Further features and advantages of our invention will become apparent from the following detailed description taken together with the drawing, in which.

DESCRIPTION OF ILLUSTRATIVE EMBODIMENTS

Figure 1:
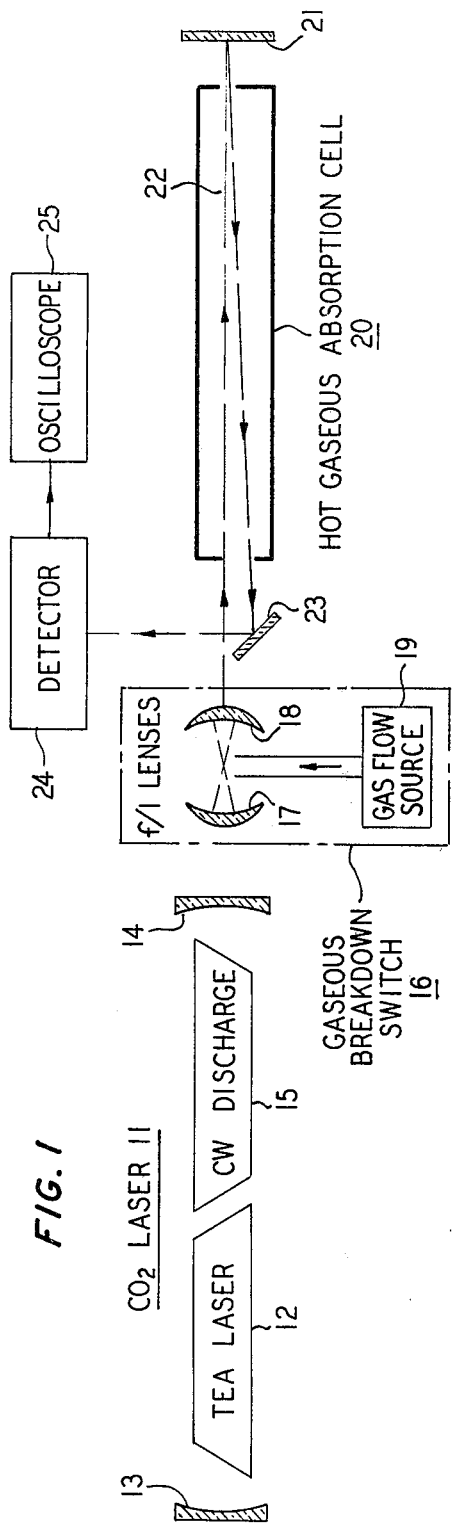
FIG. 1 is a partially pictorial and partially block diagrammatic illustration of an embodiment of the first species of the invention.

The embodiment of FIG. 1 corresponds to an experimental arrangement actually tested by us. A conventional transverse, excitation atmospheric-pressure (TEA) double discharge laser 11 is the primary source of radiation. Laser 11 primarily includes the high pressure double discharge cell 12 with Brewster angle end windows and the opposed nearly confocally separated resonator mirrors 13 and 14. It also includes an intracavity low pressure cw gain cell 15 which served to narrow the output spectrum to one axial mode. Reflector 14 was partially transmissive in order to enable the extraction of the output pulses from laser 11. The output pulses were incident upon the gaseous breakdown switch 16 which includes the spherically corrected f/1 lens pair 17 and 18 between which nitrogen gas flow was provided from a source 19. The laser breakdown spark formed in the gas between the lenses 17 and 18.

The output of switch 16 was directed upon the hot gaseous absorption cell 20 which included a reflector 21 at the opposite end to provide a double pass of the radiation therethrough. The two passes of the beam in the gas cell medium 22 were slightly angularly offset from each other so that the output beam along intercepted the oblique reflector 23, which coupled the output sidebands to the detector 24, the output of which was displayed typically on an oscilloscope 25. The medium 22 of hot gas cell 20 was typically carbon dioxide for the gas in which laser 11 employed carbon dioxide lasers. In detector 24, both pyro-electric detectors or alternatively, mercury-doped germanium photoconductors were employed to monitor the output cell.

Figure 2:
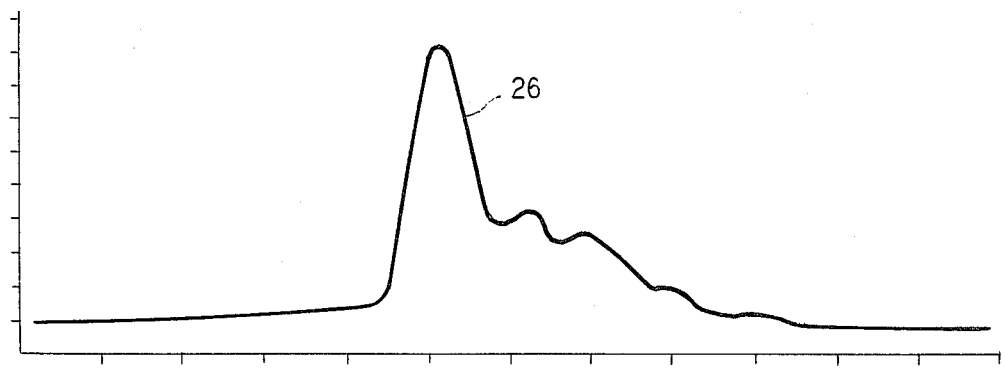
FIGS. 2 through 4 show curves that characterize the operation of the embodiment of FIG. 1.
Figure 3:
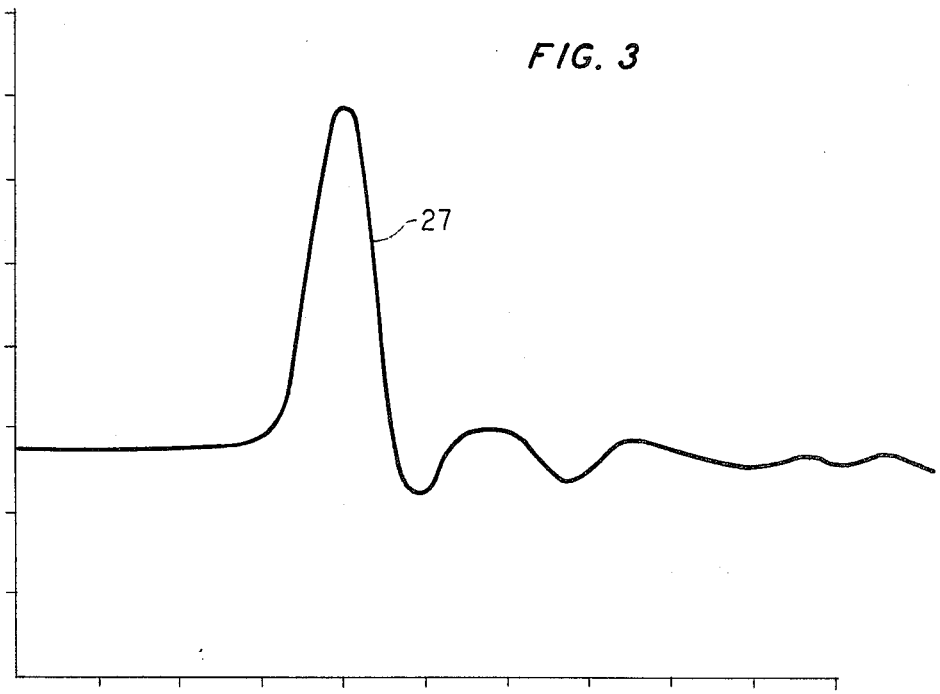

The results as obtained from oscilloscope 25 are shown in curves 26 and 27 of FIGS. 2 and 3 respectively.

The operation of the invention with regard to the particular physical dynamics involved in the species of FIG. 1 may be intuitively understood by considering an explanation of the pulse formation mechanism in the time domain, that is, with the passage of time.

The input beam is almost completely attenuated by linear absorption in the hot $CO_2$ gas. The output electric field may therefore be regarded as a destructive interference between the input field and the electric field generated by the induced linear polarization in the absorber. Since the light is almost totally absorbed, the field generated by the medium is of the same amplitude as, but 180° out of phase with, the input wave. If the input wave is suddenly cut off, as by the breakdown plasma, the molecular polarization will continue to radiate its wave (which is no longer cancelled by destructive interference) for a time related to the transverse relaxation time. The output is a pulse of essentially the same power as the input wave, opposite phase, and a duration of the order of the molecular collision time. Thus, the pulse is produced by optical free induction decay.

The above considerations are confirmed by linear systems analysis in the frequency domain, which is analogous to that of prior art spectral filters for laser gas breakdown switches. Since the plasma growth is much faster than all relaxation times in this experiment, it is sufficient to regard its effect as simply a step function cut-off of the beam. The Fourier amplitude of a step function is $\sim 1/\Delta\omega$, where $\Delta\omega$ is the frequency shift from line center. This amplitude should be multiplied by the transmittance function $T(\Delta\omega)$ of the resonant medium to obtain the Fourier spectrum of the output light.

$$T(\Delta\omega) = \exp\left\{\frac{-N}{2(1+\Delta\omega T_2)}\right\}$$

Figure 4:
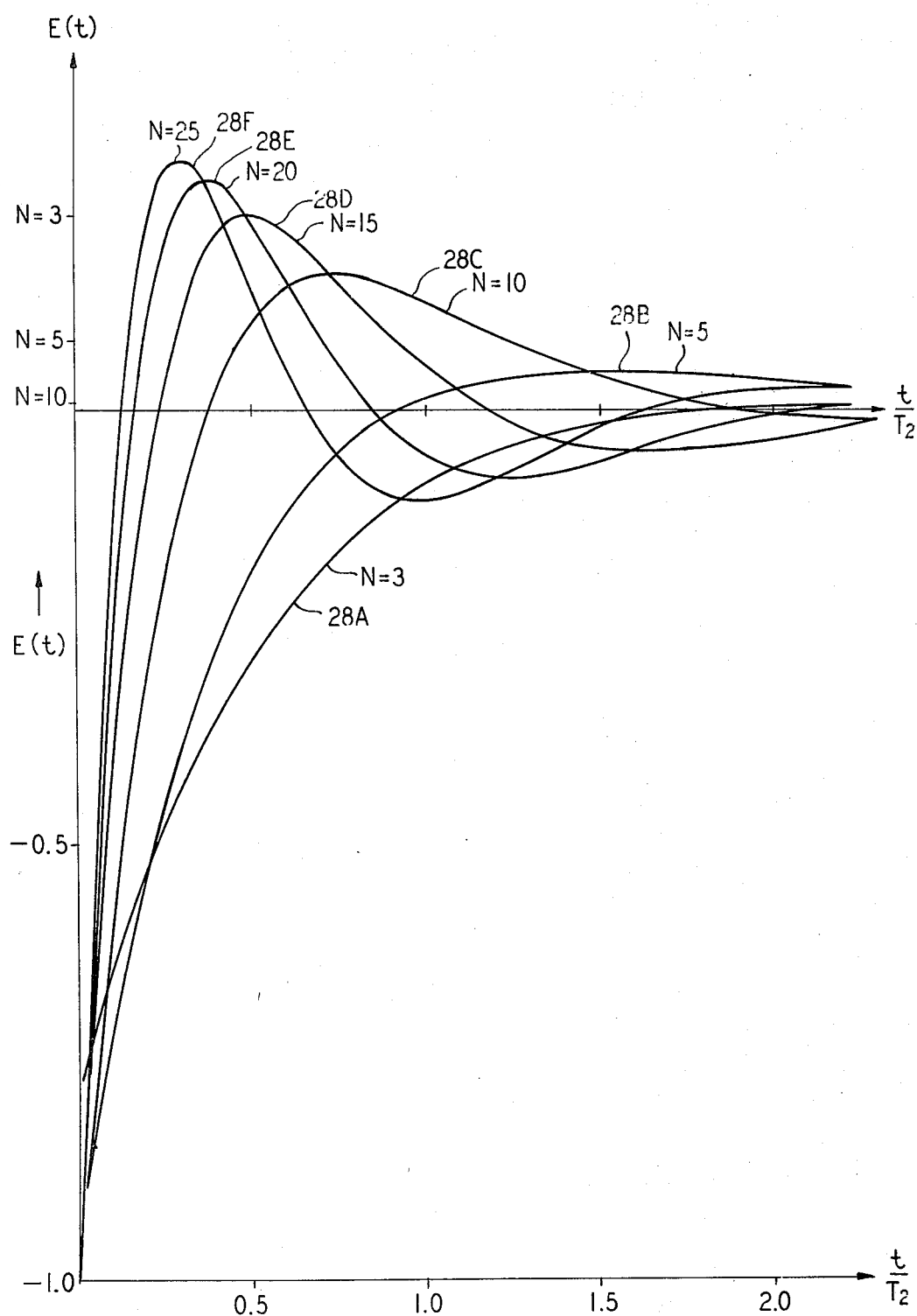

T has Lorentzian character and described both the absorption and phase shift of the medium. N is the attenuation in nepers and $$\frac{1}{\pi T_2} = 7.58 \left(\frac{300}{T}\right)^{1/2} \text{ MHz/torr}$$

is the full width of half maximum of the homogeneously broadened line. (T is the absolute temperature of the $CO_2$). The inverse Fourier transform may be performed analytically to yield the following form for the electric field amplitude of the output pulse in time:

$$E(t) = -\int_y^\infty \exp(-y^2/2N) J_1(y) dy$$

$$= \exp\left(-\frac{N}{2}\right) -\exp\left(-\frac{t}{T_2}\right) \sum_{m=0}^\infty \left(\frac{2t}{NT_2}\right)^{m/2} J_m(y)$$

where $y = 2Nt/T_2$ and $J_m$ is the Bessel function of first kind of order m. This is plotted in curves 28A through 28F of FIG. 4 for various values of the parameter N. Notice that the output field reverses phase at the instant the spark forms, confirming our intuitive discussion.

As stated above, the last given explanation is in principle analogous to that of prior art spectral filters used together with laser gas breakdown switches; but it should also be appreciated that this last explanation also tends to overlook significant differences from the prior art that have been apprehended in our invention. First and most significantly, both sidebands of the switching are transmitted to the output with minimum of loss. Second, the apparatus is extremely simple.

By way of modification of the operation of the embodiment of FIG. 1 it should be also observed that the pulse duration approximately $T_2/N$, which is highly reproducible, is adjustable in the range from about 0.1 to 0.5 nanoseconds simply by changing the gas pressure. Further, while it is desired that the medium 22 in cell 20 be held at a temperature of at least 500°C, it should be understood that the temperature merely effects the amount of absorption in medium 22 and that at a lower temperature a longer gas cell will be necessary.

This technique is unique in that the output field shape and duration are analytically determined by the linear optical properties of a passive medium. Moreover, since the pulses are generated by a linear polarization, they are also exceptionally clean, predictable and reproducible. These advantages are important for applications ranging from nonlinear optics to laser fusion. Furthermore, the concept may be extended to any laser wavelength, and more importantly to any linearly absorbing material, for the purpose of producing a wide variety of transient waveforms.

An important pulse parameter, especially for injection into a high gain saturating amplifier chain is contrast ratio; i.e. the ratio between the peak power and the power in the inevitable precursor. This is determined by our ability to absorb the unshifted laser light before the spark forms. The absorptive co-efficient of the $CO_2$ gas is increased by raising the temperature to populate the lower laser level. The maximum absorption of about 10db/meter occurred near 500°C. Above 20 torr, the lines are homogeneously broadened and the absorption co-efficient is independent of pressure. In this experiment the rejection ratio was $10^2$ since only a 2 meter path was used. In a 6 meter path the ratio would be $10^6$, which is higher than can be achieved electro-optically.

Since the spectrum induced by the laser breakdown spark is so broad, our pulse-forming technique is compatible with multi-rotational-line operation of a high pressure $CO_2$ amplifier. This is important for exploiting the efficiency of which these amplifiers are capable.

Figure 5:
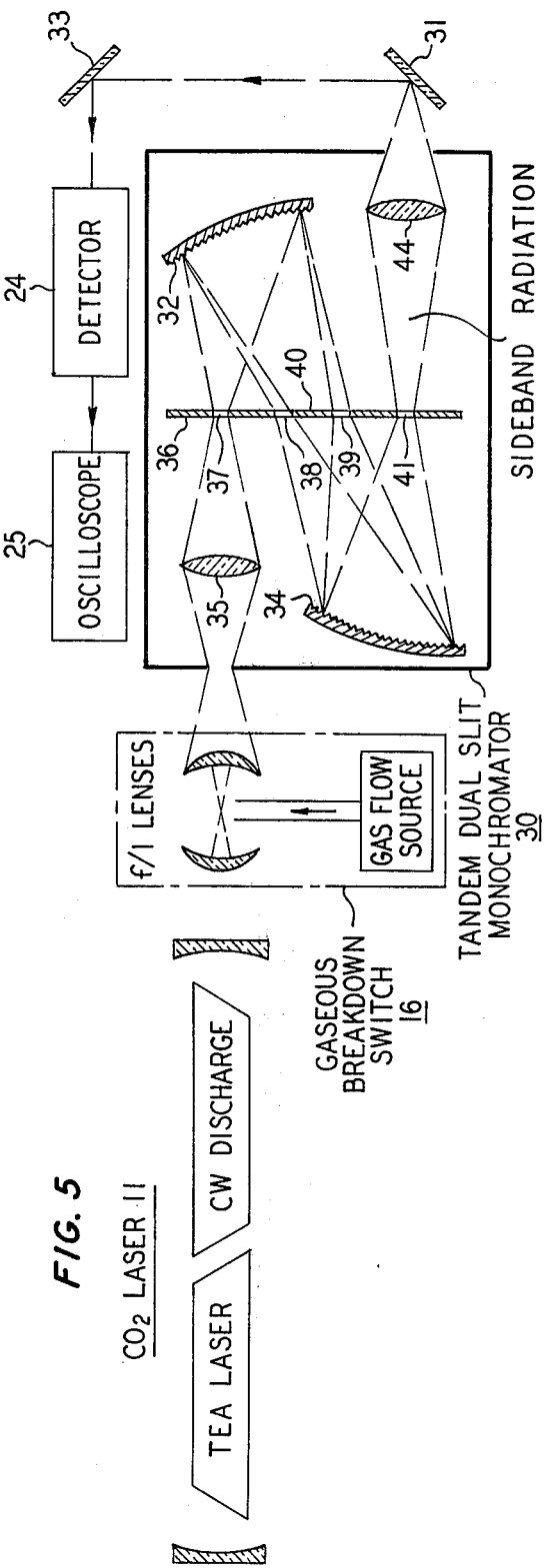
FIG. 5 is a partially pictorial and partially block diagrammatic illustration of an embodiment of the second species of our invention.

In FIG. 5 the $CO_2$ laser 11 and gaseous breakdown switch 16 are the same as in FIG. 1, as are also the detector 24 and oscilloscope 25. This species of the invention differs from that in FIG. 1 in using a different spectral filter from that of FIG. 1, but one which nevertheless transmits both sidebands yielded by the gaseous breakdown switch 16 and which, at the same time nearly as completely blocks the center wavelength supplied originally from laser 11. While the detailed dynamics of this spectral filter do not depend on optical free induction decay, as do the dynamics of hot gaseous absorption cell 20 of FIG. 1, these dynamics may be explained as follows:

The spectral filter of FIG. 5 is the tandem dual-slit monochromator 30 which receives the output from gaseous breakdown switch 16 and provides the filtered output to the redirecting reflector 31 and 33 and then to detector 24. The monochromator 30 is a tandem monochromator in that it includes two stages of dispersion of different wavelengths. These stages are provided by the focusing diffraction gratings 32 and 34; and it is a dual-slit monochromator in the sense that the two stages of its operation are joined at two slits 38 and 39, to pass both sidebands yielded by switch 16. The input to the monochromator 30 is focused on initial aperture 37 of the apertured plate 36 in monochromator 30 in order to illuminate fully the surface of diffraction grate 32 in the first stage. Aperture plate 36 also bears the dual-slit pairs, only being 38 and 39 and includes therebetween portions 40 to block the center wavelength initially supplied from laser 11 and transmitted in minor part by the gaseous breakdown switch 16.

Thus, in operation, the first stage of the monochromator 30 passes the upper and lower sidebands through slits 38 and 39 respectively and blocks most of the center wavelength at the center portion 40. The transmitted radiation again diffuses to fully illuminate the second diffraction grating 34. The upper and lower sidebands will be reconverged and will be passed by the aperture 41. Recall that radiation at the center wavelength was blocked by the center portion 40 between slits 38 and 39. The output sidebands which have the character of the desired pulses substantially as shown in FIGS. 2 and 3 are focused by collecting lens 44 through the output of monochromator 30 to reflector 31 and thence to detector 34. The corresponding display on oscilloscope 25 will not have quite as sharp a leading edge as shown in FIG. 3 because the center wavelength from laser 11 is not as completely removed as in the linearly absorbing hot gaseous absorption cell 22 of FIG. 1. Nevertheless, pulses from monochromator 30 should be highly reproducible in the absence of drifting characteristics of the relationships between components of the monochromator 30. A carefully controlled environment for monochromator 30 is therefore indicated.

It should be clear that other modifications of the present invention within its spirit and scope can be made by those skilled in the art. It should also be clear that passage of both sidebands and substantially complete absorption of the center wavelength are important to any of the projected applications of this invention, such as reproducible short rise time (0.1 to 0.5 nanosecond) pulses for nuclear fusion studies.

Further clean-up and filtering of the gas for the switch will be necessary for going to shorter times.

It is reasonable to ask, what additional considerations are important for producing shorter pulses, especially in the range of only one or two cycles. Clearly such a pulse requires a spectrum as broad as the laser frequency itself, with the highest and lowest frequencies differing by an octave. This can be provided by the spark if it terminates the beam quickly enough.

The Fourier amplitude of a step function modulation is $E(\omega') \sim 1/\omega'$. An ideal matched filter has transmittance function $G(\omega')$ proportional to $\omega'$. Notice that $G(O) = 0$ and that the product $E(\omega')$ would be constant, independent of frequency. Therefore a $\delta$-function in time would be generated, with a duration limited only by its reciprocal frequency width and a peak power equal to the incident power.

A good approximation to the ideal filter $G(\omega')$, is a one-quarter wave anti-reflection coated surface used in reflection. In practice however, such a filter is not really necessary. A multilayer dielectric filter, which transmits only the far wings of the breakdown induced spectrum would be sufficient because the far wings contain most of the high speed temporal structure, and $1/\omega'$ has only slow variation with $\omega'$ at large $\omega'$.

A more serious problem for short pulse generation and propagation is pulse stretching due to index dispersion. This difficulty is of course common to all schemes for producing short pulses. Fast pulses inherently contain many frequency components. Upon propagation through a dispersive medium, the high and low frequency components fall out of step, and the pulse is stretched in time. It may be shown, by convolving the Fourier amplitude of a short pulse with a propagation factor containing a quadratic contribution to the phase, that only pulses longer than $$\sim \sqrt{\frac{z}{c} \frac{dn}{d\omega}}$$

may propagate without stretching. Here, $z$ is the propagation thickness and $c$ the speed of light.

For the pulse generating techniques described here, dispersion in the recollimating lens and in the spectral filter may have a deleterious effect. Fortunately infrared optical materials have rather low dispersion near the $CO_2$ laser frequency, and a pulse of only a few optical cycles may be transmitted through several millimeters of Germanium, without distortion. In the visible region, such favorable window materials do not exist, and it may be necessary to compensate the dispersion with a grating pair.

In conclusion, it will be possible to generate pulses consisting of only a few optical cycles if the following problems are overcome:
  i. The rate of plasma growth in the focal region must be speeded up. This will probably require a gas which is so clean that the plasma will not nucleate until the intensity is $\sim 10^{14}$ W/cm$^2$.
  ii. The undesirable dispersion of the optical components must either be eliminated or compensated.

In the picosecond regime, these problems are solved, and the techniques described in this paper are already generating clean, predictable and reproducible optical transients. These methods are unique in that the temporal pulse shape and duration are analytically determined by the linear optical properties of a passive filter.

We claim:
1. Pulse generating apparatus comprising means for generating radiation that has at least a pulsed component and that is capable of producing breakdown in a gaseous medium, means including focusing means and said gaseous medium in tandem with said generating means for producing said breakdown in a step-wise fashion, thereby producing upper and lower sidebands of said radiation, and means in tandem with said gaseous medium for transmitting both sidebands of said radiation yielded by said breakdown and for blocking the residual radiation of said generating means.

2. Pulse generating apparatus comprising means for generating radiation that has at least a pulse component and that is capable of producing breakdown in a gaseous medium, means including a first gaseous medium in tandem with said generating means for producing said breakdown, and means including a second gaseous medium in tandem with said first medium for transmitting the sidebands of said radiation yielded by said breakdown and for linearly absorbing the residual radiation of said generating means.

3. Pulse generating apparatus according to claim 1 in which the means for transmitting both sidebands comprises a tandem dual-slit monochromator including optics for focusing the radiation, two tandem means for dispersing differing wavelengths and means including a member having a first slit intercepting the focused radiation before incidence on the first dispersing means, a second slit intercepting radiation from the second dispersing means and a pair of slits intercepting the radiation propagating from the first dispersing means to the second dispersing means and having a separation appropriate to the passage of the respective sidebands, said member including a blocking element between the slits of the said pair of slits, said central blocking element having a width equal to the separation between said pair of slits to block the residual radiation of the generating means.

4. Pulse generating apparatus according to claim 2 in which the generating means comprises a molecular gas laser and in which the means for transmitting sidebands and linearly absorbing the residual generated radiation comprises a cell containing a molecular gas including at least the active gas of said molecular gas laser, and comprises means for heating said molecular gas to select the absorption capability thereof.

* * * * *